United States Patent [19]

Machida et al.

[11] Patent Number: 5,117,953
[45] Date of Patent: Jun. 2, 1992

[54] HYDRAULICALLY CONTROLLABLE TRANSMISSION

[75] Inventors: Satoshi Machida; Muneji Okamoto; Akio Hattori; Masayuki Nakamura, all of Osaka, Japan

[73] Assignee: Kubota Corporation, Osaka, Japan

[21] Appl. No.: 556,338

[22] Filed: Jul. 20, 1990

[30] Foreign Application Priority Data

Jul. 21, 1989 [JP] Japan .................................. 1-189116
Dec. 14, 1989 [JP] Japan .................................. 1-325281
Dec. 15, 1989 [JP] Japan .................................. 1-326511

[51] Int. Cl.⁵ ...................... B60K 41/22; F16D 25/14
[52] U.S. Cl. ................................. 192/3.57; 192/109 F
[58] Field of Search ............................ 192/3.57, 109 F

[56] References Cited

U.S. PATENT DOCUMENTS

| | | | |
|---|---|---|---|
| 3,990,553 | 11/1976 | Holzinger et al. | 192/3.57 |
| 4,560,047 | 12/1985 | McCarthy et al. | 192/109 F X |
| 4,711,329 | 12/1987 | Hasegawa et al. | 192/3.57 |
| 4,877,116 | 10/1989 | Horsch | 192/3.57 |

FOREIGN PATENT DOCUMENTS

57-72334  5/1982  Japan .

Primary Examiner—Rodney H. Bonck
Attorney, Agent, or Firm—Gifford, Groh, Sprinkle, Patmore and Anderson

[57] ABSTRACT

A hydraulically operable transmission comprises a hydraulic clutch, a change speed control valve, change speed actuators controllable by the control valve, a pilot oil line for varying pressure states in response to operation of the actuators, an oil supply line extending to the hydraulic clutch, a clutch control valve operable with a pilot pressure applied from the pilot oil line to close the oil supply line, and a pressure buildup device mounted on the oil supply line. The pressure buildup device includes an oil chamber for producing predetermined pressure increase characteristics with a pilot pressure applied from the oil supply line and a spring load, a drain line extending from the oil chamber, and a drain control valve mounted on the drain line for opening and closing the drain line in response to the pilot pressure applied from the pilot oil line.

6 Claims, 6 Drawing Sheets

HYDRAULICALLY CONTROLLABLE TRANSMISSION

TECHNICAL FIELD

The present invention relates to a hydraulically operable transmission and a hydraulic circuit therefore, the hydraulic circuit including a pressure buildup device mounted on an oil supply line to a hydraulic clutch. The pressure buildup device defines an oil chamber for producing predetermined pressure increase characteristics while gradually increasing a spring pressure with a pilot pressure received from the oil supply line.

BACKGROUND OF THE INVENTION

In a conventional hydraulic circuit of this type, as shown in FIG. 2 of Japanese Utility Model Publication No. 57-72334, the oil supply line for supplying oil to the oil chamber acts also as an oil exhaust line for draining oil from the oil chamber. The oil is therefore drained from the oils chamber through a drain port of a control valve mounted on the oil supply line for switching change speed states.

Since the oil supply line acts also as the oil exhaust line, this line includes a check valve or the like. Thus, the oil drained from the oil chamber flows through the check valve and the control valve. As a result, a considerable pressure loss occurs at the check valve and the control valve. When the oil is at a low temperature and at a low viscosity, the oil tends to remain in the oil chamber without being sufficiently drained therefrom.

Sufficient drainage cannot be achieved particularly where the supply/exhaust line is long between the oil chamber and control valve or when a change speed operation is carried out within a short time. This means that a subsequent pressure buildup function is started with the oil remaining in the oil chamber. As a result, the clutch is suddenly engaged under high pressure, thereby producing a shock during a change speed operation.

SUMMARY OF THE INVENTION

An object of the present invention is to provide a hydraulically operable transmission which overcomes the above disadvantage and which includes a hydraulic circuit simple in construction and having satisfactory pressure buildup characteristics.

The above object is achieved, according to the present invention, by a hydraulically operable transmission comprising a hydraulic clutch, a change speed control valve, change speed actuators controllable by the control valve, a pilot oil line for varying pressure states in response to operation of the actuators, a pressure oil supply line extending to the hydraulic clutch, a hydraulic clutch control valve operable with a pilot pressure applied from the pilot oil line to close the pressure oil supply line, and a pressure buildup device mounted on the pressure oil supply line, the pressure buildup device including an oil chamber for producing predetermined pressure increase characteristics with a pilot pressure applied from the pressure oil supply line and a spring load, a drain line extending from the oil chamber, and a drain control valve mounted on the drain line for opening and closing the drain line in response to the pilot pressure applied from the pilot oil line.

Figure 2:
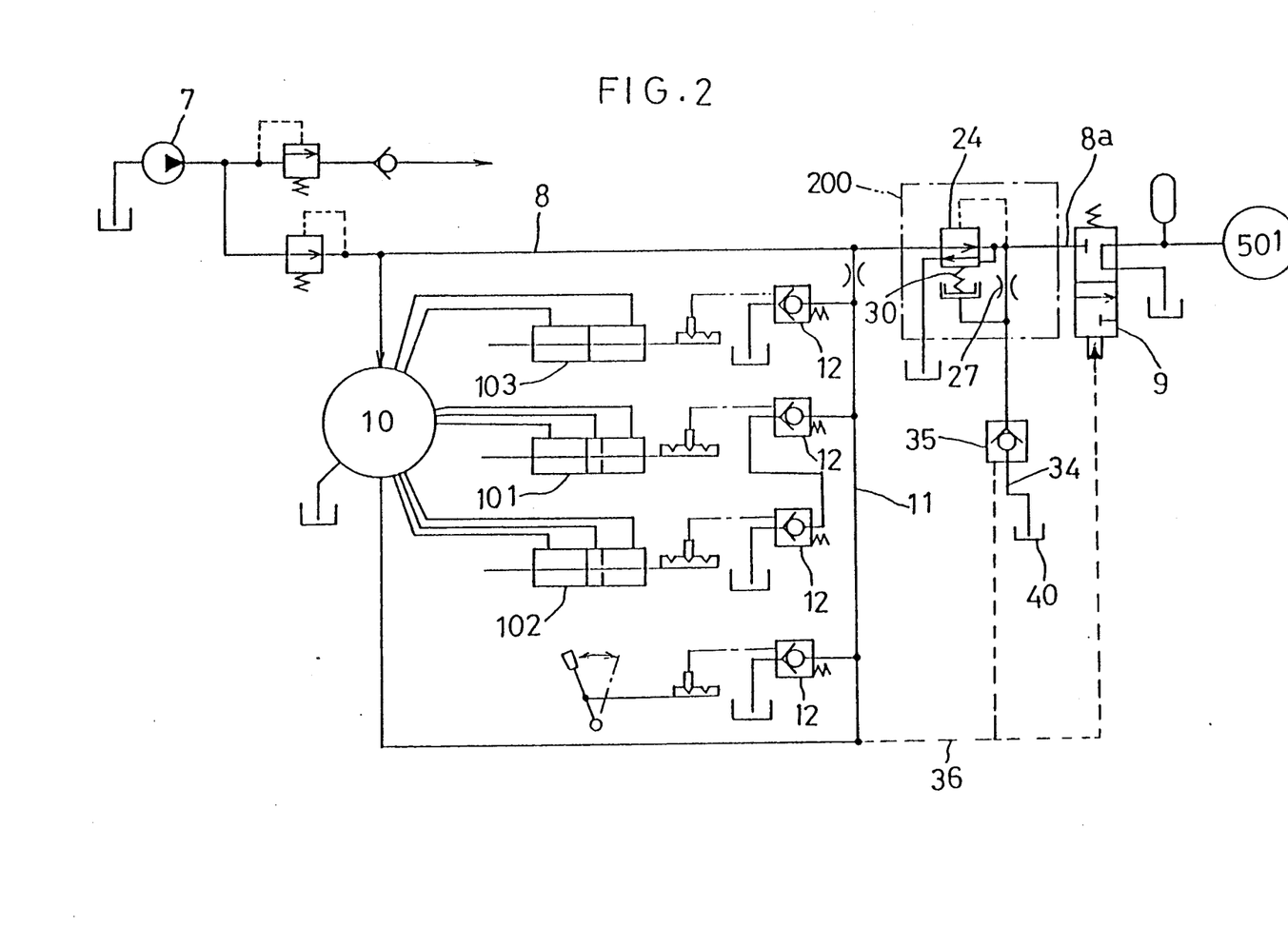
FIG. 2 is a circuit diagram showing a hydraulic circuit in a first embodiment of the present invention.

Reference is made to FIG. 2 for illustrating, by way of example, the way in which this transmission, particularly its hydraulic circuit, operates. The circuit includes a pilot oil line 11 which is placed in a low pressure condition with communication with a tank during a change speed operation, and in a high pressure condition with the communication with the tank broken after the change speed operation. A drain control valve 35 is provided on a drain line extending from the oil chamber 33 to the tank 40. The drain control valve 35 is operatively connected to the pilot oil line 11, such that the pilot pressure for the drain control valve 35 becomes low when a change speed operation is started. As a result, pressure oil is drained directly to the tank without flowing through the other type of control valve as in the prior art.

Thus, although the drain control valve is mounted on the drain line, the other type of control valve is dispensed with by providing the drain line separately from the pressure oil supply line to be used exclusively for drainage. This is effective to reduce pressure loss. The drain line for use in drainage only may be formed short since it is free from installing conditions of other control valves and the like.

Consequently, oil can be drained in a shorter time than in the prior art even if a change speed operation is effected within a short time or the oil has low viscosity. The pressure buildup device starts operating from a zero pressure condition following a change speed operation, to produce smooth clutch engaging characteristics.

In a preferred embodiment of the invention, the pressure oil supply line includes a pressure reducing valve connected parallel to the pressure buildup device, the pressure reducing valve is set to a pressure level slightly lower than a meet pressure at which contact of friction disks of the hydraulic clutch is started.

According to this construction, even where the pressure buildup device is set to start a pressure increasing action at a relatively low pressure, oil is supplied through the pressure reducing valve to the hydraulic clutch without being drained while the clutch pressure increases to the predetermined pressure following a clutch engaging operation. This expedites initial oil filling in the hydraulic clutch. When the clutch pressure exceeds the predetermined pressure, the pressure reducing valve is closed to allow the pressure buildup device to effect a smooth pressure increasing control, thereby checking a sudden increase in the clutch pressure occurring with meeting of the clutch.

Thus, the initial oil filling time from a declutched state to a clutch meet state is shortened while effectively reducing shocks occurring with meeting of the clutch, thereby realizing a quick change speed operation.

In a further preferred embodiment of the invention, the hydraulic clutch control valve comprises a pilot type two-position changeover valve including an orifice in a return passage thereof. When a change speed operation is carried out while the tractor is running, the clutch control valve is once changed from a clutching position to a declutching position, and then back to the clutching position. At the declutching time, the oil is drained from the hydraulic clutch while undergoing a flow rate control by the orifice.

Part of the oil thus remains in the hydraulic clutch when the clutch is engaged again.

Consequently, a quick change speed operation is possible with a reduced initial oil filing time taken when the clutch is engaged again since a less amount of oil is required for filling than in the prior art.

When stopping the tractor, the clutch control valve is maintained at the declutching position. And since the oil remaining in the hydraulic clutch is drained gradually through the orifice, the friction disks are held against rotation.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Embodiments of the present invention will be described hereinafter with reference to the drawings.

FIRST EMBODIMENT

Figure 1:
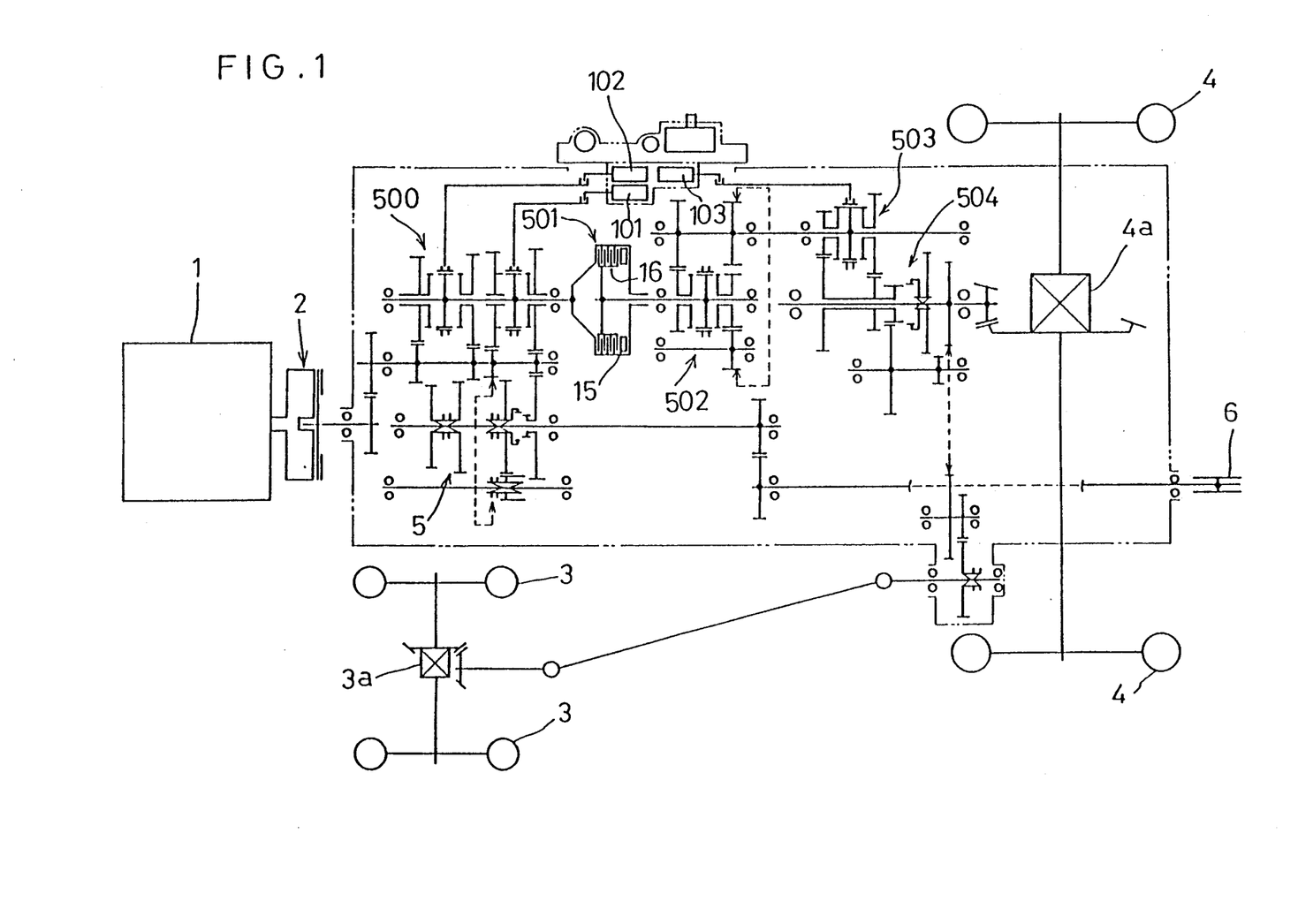
FIG. 1 is a schematic overall view of a hydraulically operable transmission according to the present invention.

Referring to FIG. 1, a drive system for a four wheel drive tractor comprises an engine 1 and a main clutch 2 for receiving power of the engine 1. A propelling line includes a main change speed device 500, a multidisk hydraulic clutch 501, a backward/forward changeover device 502, an auxiliary change speed device 503 and a super-reduction device 504 through which the power is transmitted from the main clutch 2 to differentials 3a and 4a of front and rear wheels 3 and 4. An implement drive line includes a change speed mechanism 5 for receiving the power from the main clutch 2 and driving a power takeoff shaft 6.

The main change speed device 500 includes two synchromesh change speed gearings for providing four speeds. The backward/forward changeover device 502 and auxiliary change speed device 503 also comprise the synchromesh type. The main change speed device 500 is operable by two hydraulic cylinders 101 and 102, and the auxiliary change speed device 503 is operable by a single hydraulic cylinder 103. The backward/forward changeover device 502 is manually operable. When these three types of change speed operations are carried out, the hydraulic clutch 501 is disengaged before the change speed operations and engaged upon completion thereof. Thus, the change speed operations are carried out without disengaging the main clutch 2.

Figures 3, 4, 5:
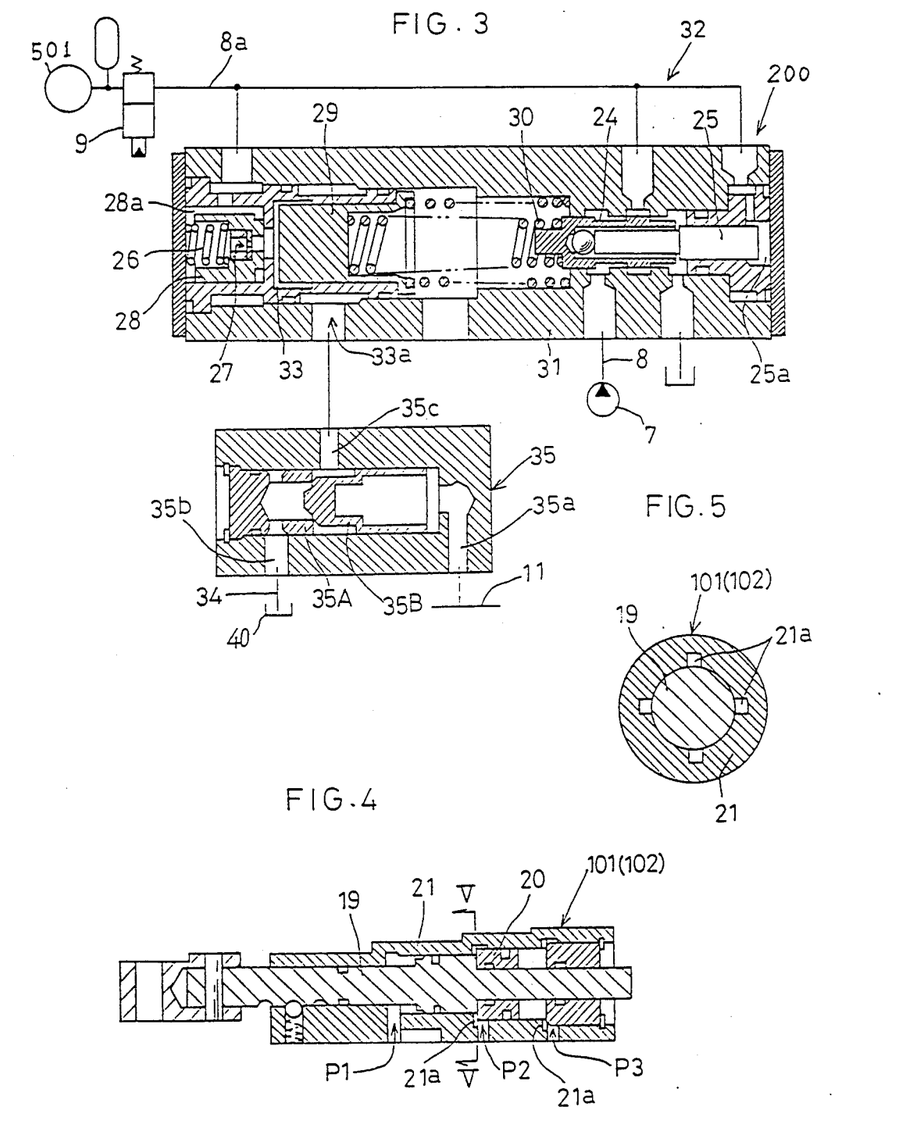
FIG. 3 is a sectional view of a pressure buildup device and a drain control valve.
FIG. 4 is a sectional view of a change speed hydraulic cylinder.
FIG. 5 is a section taken on line V—V of FIG. 4.

FIGS. 2 and 3 show a hydraulic circuit for controlling the change speed operations. This circuit comprises a pressure oil supply line 8 for transmitting pressure oil from a hydraulic pump 7 to the hydraulic clutch 501. The oil supply line 8 includes a pressure buildup device 200 and a changeover valve 9 of the type operable by a pilot pressure. A rotary type change speed control valve 10 is branched from the oil supply line 8 for controlling the three hydraulic cylinders 101, 102 and 103. Further, a pilot oil line is branched from the oil supply line 8 for producing the pilot pressure for operating the changeover valve 9.

Open/close type check valves 12 are associated with control lines for the hydraulic cylinders 101, 102 and 103 and backward/forward changeover device 502, respectively. The check valves 12 are operable at times of change speed operation, to vary the pilot pressure for the changeover valve 9 for engaging and disengaging the hydraulic clutch 501 as noted hereinbefore. As seen from FIG. 2, the check valves for the hydraulic cylinders 101 and 102 are connected in series.

The pressure buildup device 200, as will be described in detail later, is constructed to check a sudden increase in the clutch pressure and produce a clutch pressure increase with predetermined characteristics when the changeover valve 9 is operated.

The change speed hydraulic cylinders 101 and 102 will be described next. As shown in FIGS. 4 and 5, the change speed hydraulic cylinder 101 includes a direct acting spool 19 and an auxiliary spool 20 fitted on the direct acting spool 19 to be axially movable relative thereto. The hydraulic cylinder 101 defines three ports P1, P2 and P3 as shown. When oil is supplied through port P2 and drained through ports P1 and P3, the auxiliary spool 20 moves to the right end and the direct acting spool 19 to the left end in the drawing to produce a first speed state. When oil is supplied through port P1 and drained through ports P2 and P3, the direct acting spool 19 moves to the right end to produce a second speed state. When oil is further drained through port P2 and supplied through ports P1 and P3, the direct acting spool 19 and auxiliary spool 20 move to and stop halfway between the opposite ends to produce a neutral state. The hydraulic cylinder 101 has a valve case 21 including a shoulder for engaging the auxiliary spool 20 in the neutral state. This shoulder defines shallow grooves 21a at four equidistant peripheral positions as shown in FIG. 5. When the auxiliary spool 20 is in tight contact with the shoulder, the pressure oil from the port P2 flows into the grooves 21a to push and move the auxiliary spool 20. These grooves 21a are formed in the valve case 21 rather than the auxiliary spool 20. This has the advantages of simplicity in the machining process and of cost over the case of forming grooves on the auxiliary spool 20.

Referring to FIGS. 2 and 3, the pressure buildup device 200 includes a spool type valve 24, a plunger 25 partly extending into the valve 24, a valve member 28 pressed by a first spring 26 and having an orifice 27 centrally thereof, a piston 29 operable by pressure oil from the valve member 28, and a second spring 30 extending between the piston 29 and valve 24, all mounted in a casing 31. A pilot oil line 32 which receives pressure oil from the valve 24 communicates with a back pressure chamber 25a of the plunger 25 and a first oil chamber 28a housing the valve member 28, and with a hydraulic clutch 501 through an intermediate oil line 8a.

When the changeover valve 9 is turned on and pressure oil begins to flow to the hydraulic clutch 501, the plunger 25 applies a pressure to the valve 24 in a closing direction. At the same time, a pressure in an opening direction produced by movement of the piston 29 is applied to the valve 24 through the second spring 30.

The pressure oil is supplied with the two pressures counteracting each other in a balanced way.

As shown in FIG. 3, the piston 29 is housed in an oil chamber 33 with an oil passage 33a extending sideways therefrom. A drain line 34 is connected to the oil passage 33a for draining pressure oil from the oil chamber 33. This drain line 34 includes a pilot type check valve 35 acting as a drain control valve for controlling drainage from the oil chamber 33. This pilot type check valve 35 includes a valve closure member 35B which performs a checking function by contacting a valve seat 35A. The check valve 35 further includes a pilot port 35a through which a pilot pressure is applied to press the valve closure member 35B against the valve seat 35A, a drain port 35b, and an intake port 35c for receiving the pressure oil from the oil chamber 33. The pilot port 35a is connected to the pilot oil line 11. When a change speed operation is started to place the pilot oil line 11 in a low pressure condition, the valve closure member 35B is pushed rightward in the drawing by the oil exhausted from the oil chamber 33, and this drain oil returns to a tank 40. When the change speed operation is completed, the pilot oil line 11 becomes a high pressure condition and the resulting high pilot pressure pushes the valve closure member 35B back to a checking position to stop the drainage from the oil chamber 33.

SECOND EMBODIMENT

Figure 6:
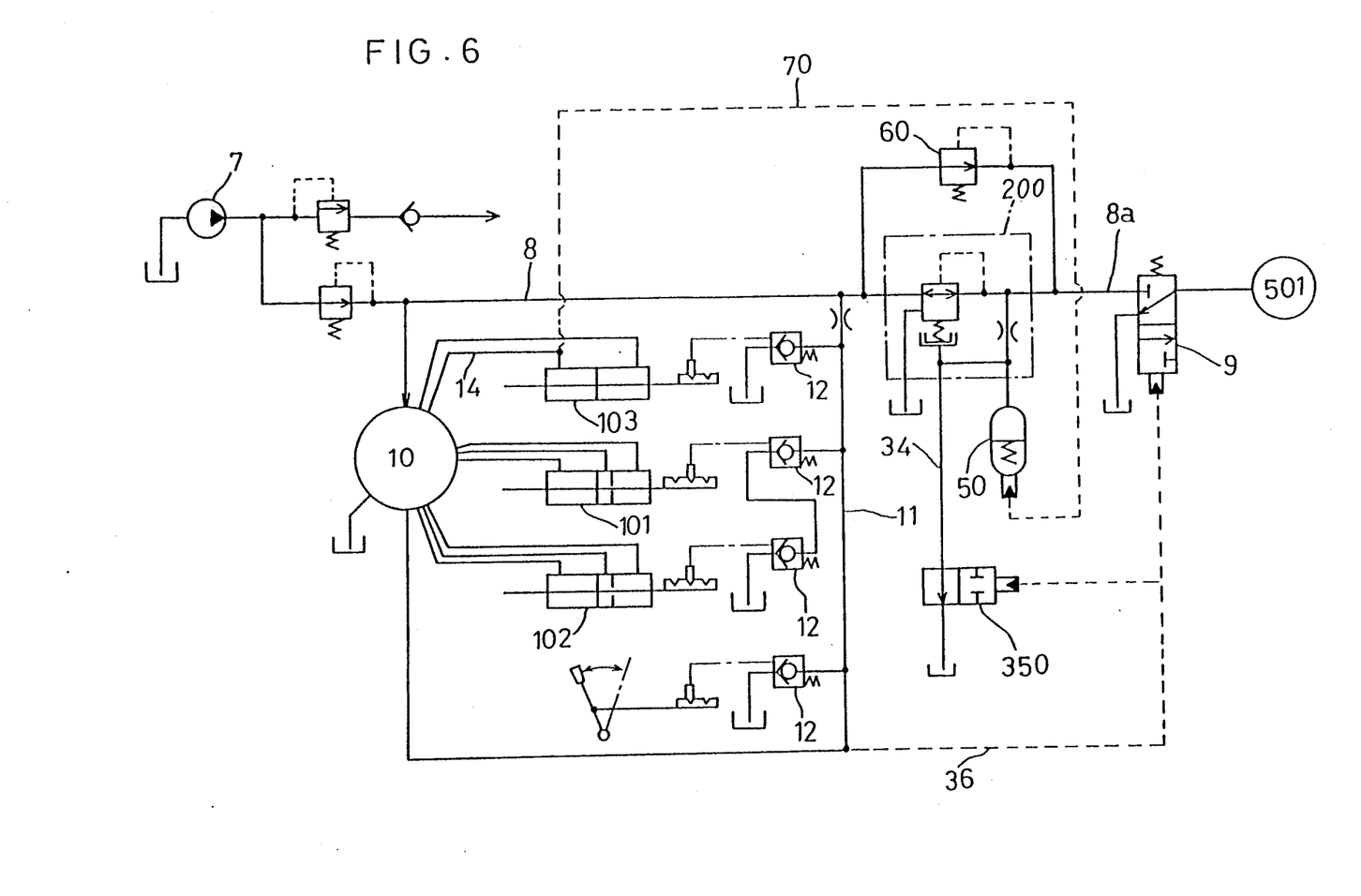
FIG. 6 is a circuit diagram showing a hydraulic circuit in a second embodiment of the invention.

FIG. 6 shows a hydraulic circuit in a second embodiment of the present invention. This circuit is similar to the circuit shown in FIG. 2, the differences being that the drain control valve comprises a pilot type two-position changeover valve 350, that a pressure reducing valve 60 is connected parallel to the pressure buildup device 200, and that a hydraulic pilot type accumulator 50 is connected to the oil chamber 33 of the pressure buildup device 200.

The hydraulic circuit of FIG. 6 will be described with regard to these newly added features only.

The hydraulic pilot type accumulator 50 connected to the oil chamber 33 of the pressure buildup device 200 has a pilot oil line 70 connected to a high speed oil line 14 of the hydraulic cylinder 103 associated with the auxiliary change speed device 503. Thus, at a time of great output torque, the accumulator 50 produces gentle pressure increase characteristics to reduce the shocks of clutch engagement.

The pressure reducing valve 60 connected parallel to the pressure buildup device 200 permits passage of pressure oil only at or below a predetermined pressure which is slightly lower than a meet pressure at which a hydraulic piston 15 of the hydraulic clutch 501 begins to contact a friction disk 16. This shortens an initial oil filling time for the hydraulic clutch 501 before reaching the meet pressure.

Figure 7:
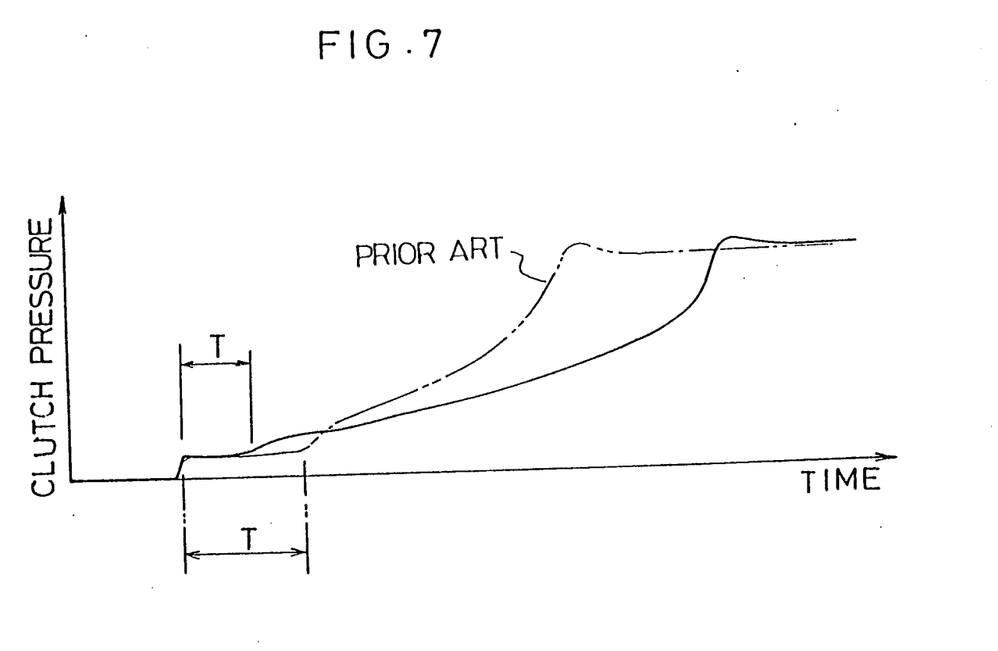
FIG. 7 is a view showing a characteristics curve of clutch pressure increase.

Even when a low speed condition is set with gentle pressure increase characteristics, the pressure reducing valve 60 is effective to shorten the initial oil filling time T from a declutched state to a clutch meet state, as compared with the time taken in the prior art shown in a dot-and-dash line in FIG. 7. This enables a quick change speed operation with a reduced time from start of the change speed operation to a half-clutch state.

THIRD EMBODIMENT

Figure 8:
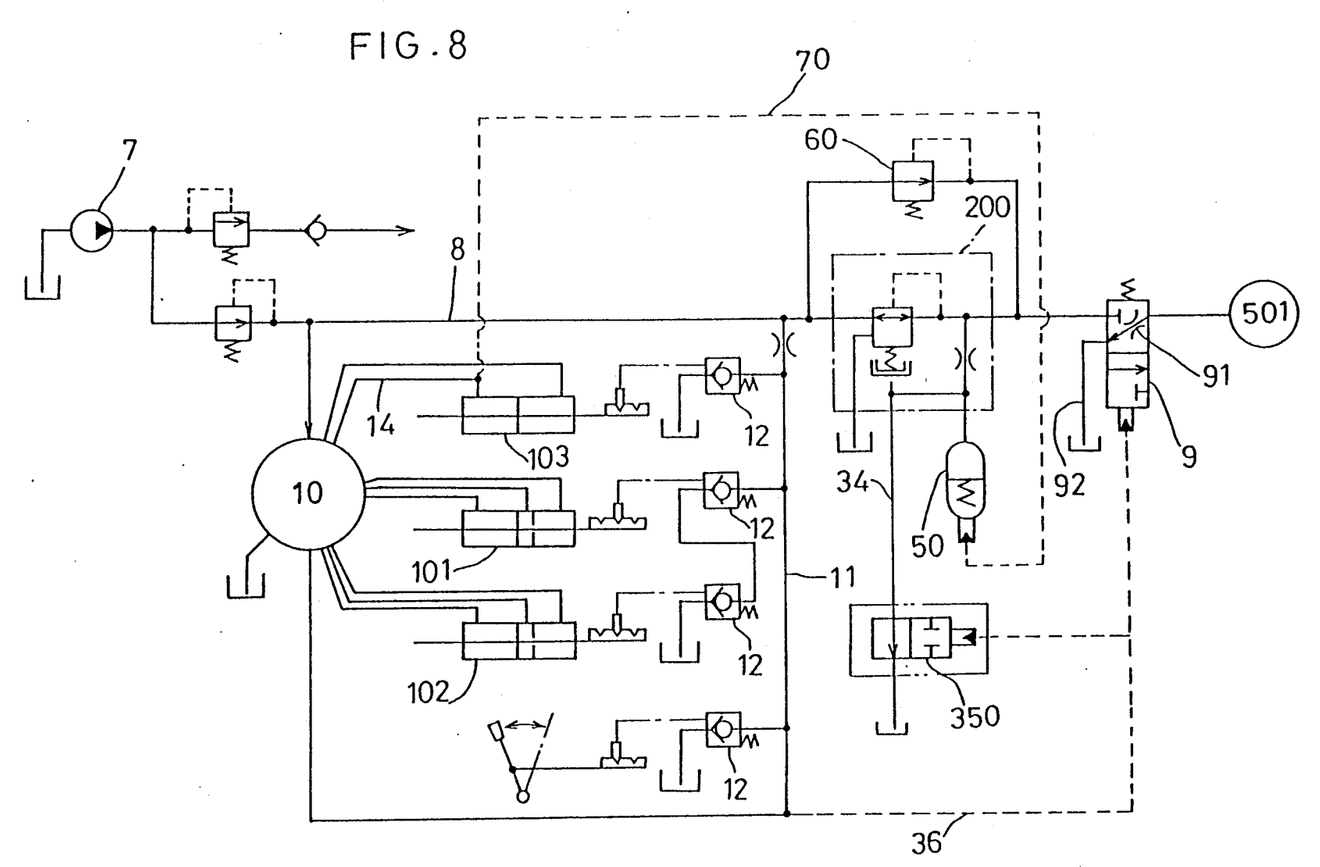
FIG. 8 is a circuit diagram showing a hydraulic circuit in a third embodiment of the invention.

FIG. 8 shows a hydraulic circuit in a third embodiment of the invention. This circuit is different from the circuit shown in FIG. 6 only in that the hydraulic clutch control valve or change over valve 9 includes an orifice 91 provided on an oil line 92 for draining residual oil from the hydraulic clutch 501.

When, for example, a change speed operation is carried out while the tractor is running, the changeover valve 9 is once changed from a clutching position to a declutching position. At this time, the orifice prevents the oil from being exhausted totally from the hydraulic clutch 501. The changeover valve 9 thus returns to the clutching position with part of the oil remaining in the hydraulic clutch 501. Consequently, a quick change speed operation is made possible with a reduced initial oil filing time from start of the change speed operation to a half-clutch state.

The orifice may be provided in a position of the drain oil line 92 outwardly of the changeover valve 9 instead of being included in the valve 9.

The way in which the hydraulically operable transmission of the present invention operates will be described with reference to the hydraulic circuit shown in FIG. 8.

When the driver operates a change speed lever, the rotary valve 10 acts to produce the following conditions:

1. The pilot oil line 36 is once drained to turn off the changeover valve 9 and disengage the clutch 501. At the same time the two-position valve 350 is opened to reduce the pressure in the oil line 34, thereby initializing the pressure buildup device 200.

2. Oil is fed to the cylinders 101-103 in accordance with the type of change speed operation, to actuate shifters of the change speed devices. The clutch 501 remains disengaged during the change speed operation.

The check valve 12 is closed upon completion of the change speed operation, thereby increasing the pressure in the pilot oil line 36 to operate the changeover valve 9 for supplying oil to the clutch 501. The pressure in the clutch 501 gradually increases by action of the pressure reducing valve 60, pressure buildup device 200 and accumulator 50.

Since the pressure applied to the clutch 501 gradually increases up to the predetermined pressure, e.g. 20 kg f/cm$^2$, set to the pressure reducing valve 60, the clutch 501 is smoothly engaged with little shock. The clutch 501 remains engaged till a next change speed operation.

What is claimed is:

1. A hydraulically operable transmission comprising;
   a hydraulic clutch,
   a change speed control valve,
   change speed actuator means controllable by said control valve,
   a pilot oil line for varying pressure states in response to operation of said actuator means,
   a pressure oil supply line extending to said hydraulic clutch,
   a hydraulic clutch control valve operable with a pilot pressure applied from said pilot oil line to close said pressure oil supply line, and
   pressure buildup means mounted on said pressure oil supply line, said pressure buildup means including;
   an oil chamber for producing predetermined pressure increase characteristics with a pilot pressure applied from said pressure oil supply line and a spring load,
   a drain line extending from said oil chamber, and a drain control valve mounted on said drain line for opening and closing said drain line in response to the pilot pressure applied from said pilot oil line.

2. A hydraulically operable transmission as claimed in claim 1, wherein said pressure buildup means further includes;

a valve for opening and closing said pressure oil supply line, spring means for urging said valve in an opening direction, and a piston mounted in said oil chamber to be slidable with an increase in the pilot pressure applied from said pressure oil supply line, thereby increasing the urging force of said spring means urging said valve in the opening direction.

3. A hydraulically operable transmission as claimed in claim 1, wherein said drain control valve comprises a pilot type check valve.

4. A hydraulically operable transmission as claimed in claim 1, wherein said drain control valve comprises a pilot type two-position changeover valve.

5. A hydraulically operable transmission as claimed in claim 1, wherein said pressure oil supply line includes a pressure reducing valve connected parallel to said pressure buildup means, said pressure reducing valve is set to a pressure level slightly lower than a meet pressure at which contact of friction disks of said hydraulic clutch is started.

6. A hydraulically operable transmission as claimed in claim 1, wherein said hydraulic clutch control valve comprises a pilot type two-position changeover valve including an orifice in a return passage thereof.

* * * * *